United States Patent
Iwai et al.

[19]

[11] Patent Number: 5,806,498
[45] Date of Patent: Sep. 15, 1998

[54] SYSTEM FOR DETERMINING MALFUNCTIONS OF A FUEL INJECTION CONTROL APPARATUS

[75] Inventors: Akira Iwai, Toyota; Shigeki Hidaka, Kariya, both of Japan

[73] Assignee: Toyota Jidosha Kabushiki Kaisha, Toyota, Japan

[21] Appl. No.: 864,393

[22] Filed: May 28, 1997

[30] Foreign Application Priority Data

May 30, 1996 [JP] Japan .................................. 8-136740

[51] Int. Cl.⁶ ........................... F02M 37/04; F02D 31/00
[52] U.S. Cl. ........................................... 123/502; 123/359
[58] Field of Search .................................. 123/357, 359, 123/500, 501, 502, 198 D, 198 DB

[56] References Cited

U.S. PATENT DOCUMENTS

| | | | |
|---|---|---|---|
| 4,502,439 | 3/1985 | Nagase et al. | 123/357 |
| 4,541,380 | 9/1985 | Oshizawa et al. | 123/357 |
| 5,188,084 | 2/1993 | Sekiguchi | 123/502 |
| 5,682,864 | 11/1997 | Shirakawa | 123/569 |
| 5,697,347 | 12/1997 | Enomoto et al. | 123/502 |
| 5,706,780 | 1/1998 | Shirakawa | 123/500 |

FOREIGN PATENT DOCUMENTS

| | | |
|---|---|---|
| 318023 | 3/1991 | Japan . |
| 5187300 | 7/1993 | Japan . |

*Primary Examiner*—Thomas N. Moulis
*Attorney, Agent, or Firm*—Kenyon & Kenyon

[57] ABSTRACT

A system is for a diesel engine for detecting malfunctioning of an injection timing control apparatus. The apparatus controls an injection timing of fuel, pressurized by a pump, to be injected from injection nozzles. An electronic control unit (ECU) computes a target injection timing based on the running condition. The ECU controls the injection timing to set the actual injection timing to the target injection timing. The ECU computes a difference between the actual injection timing and the target injection timing. The ECU determines whether the injection timing control apparatus is malfunctioning when the difference between the actual timing and the target timing is greater than a predetermined value. The determination by the ECU is altered in accordance with the running condition of the engine.

15 Claims, 9 Drawing Sheets

Continue to Step 140

SYSTEM FOR DETERMINING MALFUNCTIONS OF A FUEL INJECTION CONTROL APPARATUS

BACKGROUND OF THE INVENTION

The present invention relates to a fuel injection control system employed in a diesel engine for injecting fuel into cylinders from corresponding injection nozzles in accordance with the operating state of the engine. More particularly, the present invention pertains to an apparatus for determining whether of the fuel injection control apparatus is functioning properly.

There is a known apparatus that controls the driving of a fuel injection timing adjusting mechanism. Such an apparatus controls the actual injection timing for the fuel to be injected from an injection nozzle to match the target injection timing, which is set in accordance with the driving conditions of the diesel engine.

The injection timing adjusting mechanism, for example, is equipped in a distribution type injection pump. This injection pump distributes and supplies fuel under pressure to the injection nozzles of the diesel engine as a plunger makes a rotational and reciprocating movement. This adjusting mechanism includes a timer piston which is movable by fuel pressure; a roller ring, which rotates to alter the reciprocation timing for the plunger; a slide pin, which couples the timer piston to the roller ring; and an electromagnetic valve (timing control valve), which adjusts the level of hydraulic pressure to be applied to the timer piston.

The electromagnetic valve operates in accordance with an instruction signal from a computer. When the degree of opening of, or the angle of, the electromagnetic valve is changed, fuel pressure to be applied to the timer piston is changed. The reciprocation of the timer piston swings the slide pin and rotates the roller ring. The rotation of this roller ring alters the reciprocation timing of the plunger, adjusting the injection timing for fuel is to be injected from the injection nozzles.

Various apparatuses have been proposed to determine whether the above-discussed injection timing control apparatus is malfunctioning. Japanese Patent Publication No. Hei 3-18023, for example, discloses an apparatus that determines whether such a malfunction exists based on the difference between the target injection timing and the actual injection timing. When the difference is greater than a predetermined reference value, it is determined that the injection timing control apparatus is malfunctioning.

The optimal injection timing (target injection timing) for a diesel engine varies depending on the running conditions of the engine, which include the engine speed and engine load. In a transient state such as a time of rapid acceleration, for example, the target injection timing is altered quickly. The injection timing adjusting mechanism operates with some response delay because the activation of the electromagnetic valve, the movement of the timer piston, the swinging of the slide pin and the rotation of the roller ring takes place from the point when the computer issues an instruction signal according to the target injection timing until the point when the reciprocation timing for the plunger is changed. This delay in the response becomes greater as the target injection timing changes more rapidly. If the injection timing adjusting mechanism operates properly, the difference between the actual injection timing and the target injection timing becomes greater in transient states due to the delayed response.

The apparatus disclosed in the above-mentioned Patent Publication No. Hei 3-18023 does not take the delayed response of the injection timing adjusting mechanism into account. Further, this apparatus uses a single reference value regardless of the running conditions of the diesel engine. This hinders affective malfunction detection in transient states.

SUMMARY OF THE INVENTION

Accordingly, the present invention has been accomplished in view of the above problems, and it is an object of the present invention to provide a system that accurately detects malfunctioning of an injection timing control apparatus.

To achieve the above objective, the present invention provides a system for a diesel engine for detecting malfunctioning of an injection timing control apparatus. The apparatus controls an injection timing of fuel, pressurized by a pump, to be injected from injection nozzles. The system includes a first detecting means for detecting a running condition of the engine as a detected value, a first computing means for computing a target injection timing based on the running condition detected by the first detecting means, a second detecting means for detecting an actual injection timing, a control means for controlling the injection timing to set the actual injection timing to the target injection timing, a second computing means for computing a difference between the actual injection timing and the target injection timing, and a first determining means for determining whether the injection timing control apparatus is malfunctioning. The first determining means determines that the injection timing control apparatus is malfunctioning when the difference computed by the second computing means is greater than a predetermined value. The determination by the first determining means is altered in accordance with the running condition of the engine.

Other aspects and advantages of the invention will become apparent from the following description, taken in conjunction with the accompanying drawings, illustrating by way of example the principals of the invention.

BRIEF DESCRIPTION OF THE DRAWINGS

The invention, together objects and advantages thereof, may best be understood by reference to the following description of the presently preferred embodiments together with the accompanying drawings.

DETAILED DESCRIPTION OF THE PREFERRED EMBODIMENTS

(First Embodiment)

A first embodiment according to the present invention will hereafter be described with reference to FIGS. 1 through 3.

Figure 1:
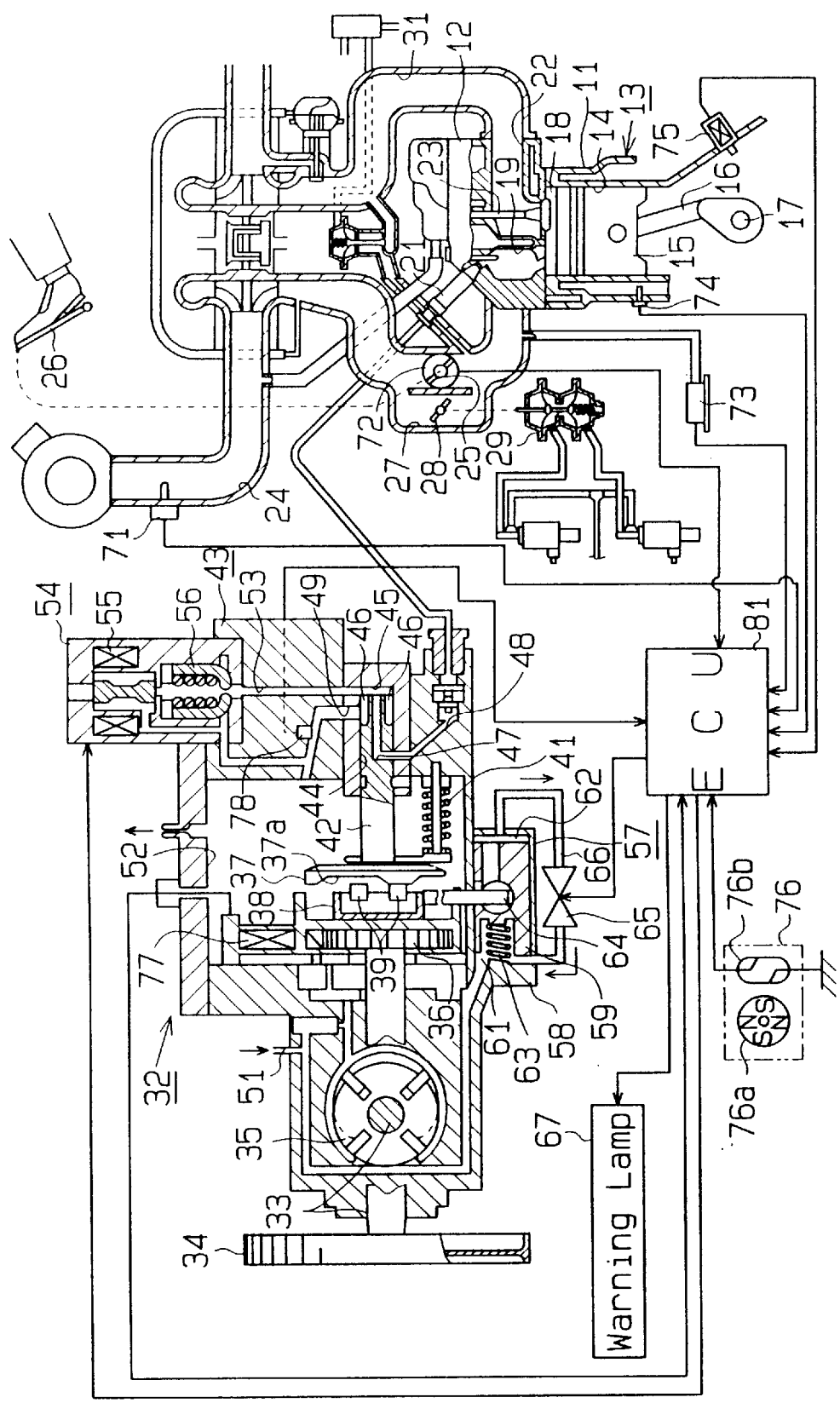
FIG. 1 is a diagrammatic drawing showing the structure of a diesel engine and fuel injection pump.
Figure 2:
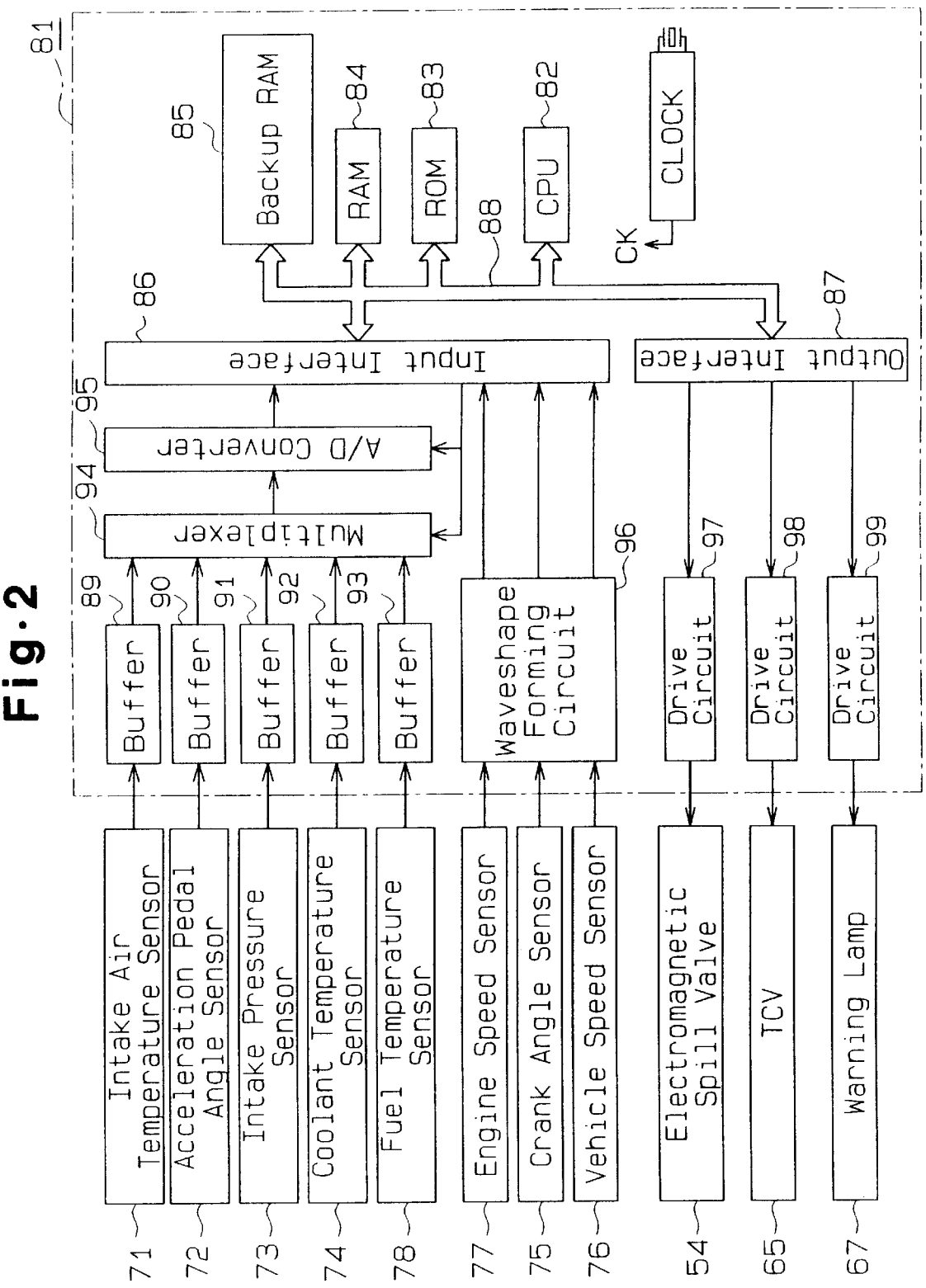
FIG. 2 is a block diagram showing the electric structure of an electronic control unit.

As shown in FIG. 1, a diesel engine 13 is installed in a vehicle. The engine 13 is provided with a plurality of cylinders 14. Pistons 15 are accommodated in the respective cylinders 14. Each piston 15 is coupled to a crankshaft 17 via a connecting rod 16. Reciprocation of each piston 15 is transformed to the rotational motion of the crankshaft 17 via the associated connecting rod 16.

A main combustion chamber 18 is defined in each cylinder 14 between the piston 15 and a cylinder head 12. A sub-combustion chamber 19 is provided for each cylinder 14. The associated chambers 18, 19 are communicated with each other. Fuel is injected into each sub-combustion chamber 19 from the corresponding injection nozzle 21.

An intake port (not shown) and an exhaust port 22, which communicate with the main combustion chamber 18, are provided in the cylinder head 12. A intake valve (not shown) and an exhaust valve 23 are supported in the cylinder head 12 to open and close the intake port and the exhaust port 22.

A throttle valve 25 is provided in the intake passage 24. The throttle valve 25 is opened and closed in cooperation with the lowering of an acceleration pedal 26. A bypass passage 27 is defined adjacent to the throttle valve 25 in the intake passage 24. A bypass restriction valve 28 is arranged in the bypass passage 27. The opening and closing of the restriction valve 28 is controlled by an actuator 29 in accordance with various operating conditions of the engine 13. For example, the restriction valve 28 is opened halfway during idling of the engine 13 to reduce noise and vibrations. The valve 28 is completely opened when the engine 13 is running in a normal state, and completely closed when the engine 13 is stopped.

Each piston 15 reciprocates twice and the crankshaft 17 rotates twice during one cycle, from the point of the suction of air into the associated cylinder 14 to the point of exhaustion of exhaust gas. This cycle consists of four strokes, the suction stroke, compression stroke, combustion stroke and exhaust stroke.

In the suction stroke, each piston 15 moves downward and the intake valve is opened while the exhaust valve 23 is closed. The negative pressure generated by the downward movement of the piston 15 causes air to be supplied into the associated cylinder 14 via the intake passage 24, the bypass passage 27, the throttle valve 25 and the bypass restriction valve 28. In the compression stroke, the intake valve is closed and each piston 15 moves upward. At this time, the air supplied into the associated cylinder 14 is compressed to yield high pressure and high temperature. In the combustion stroke, each injection nozzle 21 is opened so that fuel mist is injected into the sub-combustion chamber 19. This fuel is mixed with the high-temperature and high-pressure air in the combustion chambers 18 and 19 and is self-combusted rapidly. The pressure generated then moves the piston 15 downward. In the exhaust stroke, the exhaust valve 23 is opened and the piston 15 moves upward. The upward movement of the piston 15 causes the exhaust gas to be discharged from the associated cylinder 14. This gas is discharged outside via the exhaust port 22 and an exhaust passage 31.

The injection pump 32, which is connected to the nozzles 21 to supply fuel to the cylinders 14 will now be described. The injection pump 32 is a distribution type injection pump that causes a plunger 42 to reciprocate while rotating the plunger 42 to distribute and supply fuel under pressure to the individual injection nozzles 21. A drive shaft 33 is rotatably coupled to the injection pump 32. A drive pulley 34 is secured to the distal end of the drive shaft 33 (left end as viewed in the drawing). The drive pulley 34 is connected to a crankshaft 17 of the engine 13 by a belt (not shown). The rotation of the crankshaft 17 is transmitted to the drive shaft 33 through the drive pulley 34 and the belt.

A vane-type fuel feed pump 35 (shown in a state rotated 90 degrees in FIG. 1 for convenience) is arranged on the drive shaft 33 in the injection pump 32. A disc-like pulser 36 is secured to the basal end of the drive shaft 33 (right end as viewed in FIG. 1). A plurality of teeth provided along the periphery of the pulser 36. The basal end of the drive shaft 33 is coupled to a cam plate 37 by means of a coupling (not shown).

A roller ring 38, which pivots to change the fuel injection timing, is arranged between the pulser 36 and the cam plate 37. The cam plate 37 has a plurality of face cams 37a. The number of face cams 37a coincides with the number of the cylinders 14 provided in the engine 13. Cam rollers 39 are arranged on the roller ring 38. The face cams 37a are opposed to the cam rollers 39. A spring 41 constantly urges the cam plate 37 toward the cam rollers 39. This causes constant engagement between the face cams 37a and the cam rollers 39.

A fuel pressurizing plunger 42 is fixed to the cam plate 37. The cam plate 37 and the plunger 42 rotate integrally with the drive shaft 33. The rotating force of the drive shaft 33 is transmitted to the cam plate 37 by means of the coupling. The cam plate 37 is engaged with the cam rollers 39 as it rotates. The engagement moves the cam plate 37 back and forth on the cam rollers 39. That is, the cam plate 37 reciprocates for a number of times equal to the number of face cams 37a, or the number of cylinders 14. The reciprocating movement of the cam plate 37 simultaneously reciprocates the plunger 42 in an integral manner as it rotates.

The plunger 42 is fitted into the cylinder 44 of a pump housing 43. A high pressure chamber 45 is defined between the distal end of the plunger 42 and the inner surface of the cylinder 44. Intake grooves 46 and distribution ports 47 are defined in the plunger 42 at its distal end. The number of intake grooves 46 and the number of distribution ports 47 are equal to the number of the cylinders 44 in the engine 13. Distribution passages 48, which correspond to the distribution ports 47, and intake ports 49, which correspond to the intake grooves 46, are provided in the pump housing 43.

Rotation of the drive shaft 33 and actuation of the feed pump 35 sends the fuel, which is reserved in a fuel tank (not shown), to a fuel chamber 52 via a fuel supply port 51. When the plunger 42 moves in a direction corresponding to the suction stroke, the pressure chamber 45 is depressurized. In this state, communication between the intake grooves 46 and the suction ports 49 draws fuel into the pressure chamber 45 from the fuel chamber 52 via a fuel supply port 51. When the plunger 42 moves in a direction corresponding to the compression stroke, the pressure chamber 45 is pressurized. In this state, fuel is pressurized and sent to the injection nozzles 21 via the distribution passages 48.

A fuel spill passage 53, which connects the pressure chamber 45 and the fuel chamber 52, is defined in the pump housing 43. An electromagnetic spill valve 54, which is normally opened, is provided in the spill passage 53. The spill valve 54 includes a coil 55 and a valve body 56. When the coil 55 is de-energized, the valve body 56 is opened. This allows fuel to spill into the fuel chamber 52. When the coil 55 is energized, the valve body S6 is closed. This restricts the spilling of the fuel.

Accordingly, the opening and closing of the spill valve 54 is controlled by altering its energized time. This, in turn, adjusts the spilling of fuel from the pressure chamber 45 to the fuel chamber 52. During the compression stroke of the plunger 42, the spill valve 54 is opened to depressurize the fuel in the fuel chamber 45 and stop the injection of fuel from the injection nozzles 21. In other words, regardless of the compression stroke, opening of the spill valve 54 prevents the fuel pressure from increasing and stops the injection of fuel from the injection nozzles 21. Therefore, during the compression stroke of the plunger 42, the timing to terminate the injection of fuel from the injection nozzles 21 is altered by controlling the opening and closing timing of the spill valve 54. This adjusts the amount of fuel injected from the nozzles 21.

A timer 57 (shown in a state rotated 90 degrees in FIG. 1 for convenience) is provided below the pump housing 43 to alter the timing of the fuel injection. The timer 57 alters the timing of the engagement between the face cams 37a and the cam rollers 39, or the reciprocating timing of the cam plate 37 and the plunger 42, by varying the position of the roller ring 38 with respect to the rotating direction of the drive shaft 33.

The timer 57 is driven by hydraulic pressure and includes a housing 58 and a piston 59 retained in the housing 58. A low pressure chamber 61 is defined in one side (left side as viewed in FIG. 1) of the housing 58 while a pressurizing chamber 62 is defined in the other side (right side as viewed in FIG. 1) of the housing 58. A spring 63 urges the piston 59 toward the pressurizing chamber 62. The piston 59 is connected to the roller ring 38 by a slide pin 64.

The fuel pressurized by the feed pump 35 is sent to the pressurizing chamber 62. The position of the piston 59 is determined by the balance between the fuel pressure and the urging force of the spring 63. This effects the position of the roller ring 38 and determines the reciprocating timing of the plunger 42. As the piston 59 moves toward the low pressure chamber 61, the injection timing is delayed.

Fuel is used as the hydraulic fluid of the timer 57. Thus, the timer 57 is provided with a timing control valve (TCV) 65 to adjust the hydraulic pressure, or the fuel pressure. The TCV 65 is arranged in a communication passage 66, which connects the pressurizing chamber 62 to the low pressure chamber 61 in the housing 58. The TCV 65 is an electromagnetic valve, which is opened and closed by a duty controlled energizing signal. The opening of the TCV 65 is varied to adjust the fuel pressure in the pressurizing chamber 62. The adjustment of the fuel pressure alters the reciprocating timing of the plunger 42 and adjusts the fuel injection timing of the injection nozzles 21.

A warning lamp 67 is arranged in an instrument panel (not shown) of the vehicle to indicate a malfunction of the injection control apparatus and warn the driver.

The following sensors are provided to detect the running condition of the engine 13. An intake air temperature sensor 71 is provided near the inlet of the intake passage 24. The temperature sensor 71 detects the intake air temperature THA. An acceleration pedal angle sensor 72, which detects an acceleration pedal angle ACCP from the opened state of the throttle valve 25, is provided in the intake passage 24. An intake pressure sensor 73, which detects the intake pressure VPIM of intake port, is provided in the vicinity of the intake port.

The diesel engine is further provided with a coolant temperature sensor 74, which detects the coolant temperature THW, and a crank angle sensor 75, which detects a reference rotational position of the crankshaft 17 (e.g., the rotational position of the crankshaft 17 with respect to the top dead center of the piston 15 in a designated cylinder 14).

A transmission (not shown) is provided with a vehicle speed sensor 76, which detects the vehicle speed SP. The speed sensor 76 includes a magnet 76a, which is rotated by the rotation of a gear provided in the transmission, and a reed switch 76b. The vehicle speed SP is detected by the activation and deactivation of the reed switch 76b during rotation of the magnet 76a.

A engine speed sensor 77 is arranged to move integrally with the roller ring 38 and is near the peripheral surface of the pulser 36. The speed sensor 77 is constituted by an electromagnetic pick-up coil and outputs pulse signals as the sensor 77 passes over the projections that project from the peripheral surface of the pulser 36. That is, the speed sensor 77 outputs a pulse signal when the drive shaft 33 of the engine 13 is rotated for every predetermined crank angle. The rotating speed NE of the injection pump 32, or crankshaft 17 (engine speed) is detected based on the pulse signal. Since the speed sensor 77 is integral with the roller ring 38, the sensor 77 is not influenced by the position of the ring 38, which is controlled by the timer 57, and outputs a constant reference signal in accordance with the movement of the plunger 42.

A fuel temperature sensor 78 is provided in the pump housing 43 to detect the operational status of the injection pump 32. The sensor 78 incorporates a thermistor whose electric resistance is greatly changed by temperature, and detects the temperature, THF, of fuel to be supplied to the engine 13 (fuel temperature) based on the electric resistance of the thermistor.

The electromagnetic valve 54 and the TCV 65, which are provided in the injection pump 32, and the warning lamp 67 are each connected to an electronic control unit (ECU) 71. Each of the above sensors 71–78 are connected to the ECU 71. The ECU 71 controls the drive timing of these members in accordance with the signals sent from the sensors 71–78.

The structure of the ECU 71 will now be described with reference to the block drawing of FIG. 2. The ECU 71 includes a central processing unit (CPU) 82, a predetermined control program, a read only memory (ROM) 83, a random access memory (RAM) 84, and a backup RAM 85. The CPU 82, the ROM 83, the RAM 84, and the backup RAM 85 are each connected to an input interface 86 and an output interface 87 by a bus 88.

The intake air pressure sensor 71, the acceleration pedal angle sensor 72, the intake pressure sensor 73, the coolant temperature sensor 74 and the fuel temperature sensor 78 are connected to buffers 89, 90, 91, 92, 93 respectively. The buffers 89–93 are each connected to a multiplexer 94. The multiplexer 94 is connected to an analog to digital (A/D) converter 95, which is connected to the input interface 86. The crank angle sensor 75, and the vehicle speed sensor 76 and the engine speed sensor 77, are connected to the input interface 86 by way of a waveform shaping circuit 96. The CPU 82 reads the signals that are sent from the sensors 71–78 through the input interface 86.

The electromagnetic spill valve 54, the TCV 65 and the warning lamp 67 are connected to drive circuits 97, 98, 99, respectively. The drive circuits 97–99 are each connected to the output interface 87. The CPU 82 optimally controls the electromagnetic spill valve 54, the TCV 65 and the warning lamp 67 based on the detected values read through the input interface 86.

Figure 3:
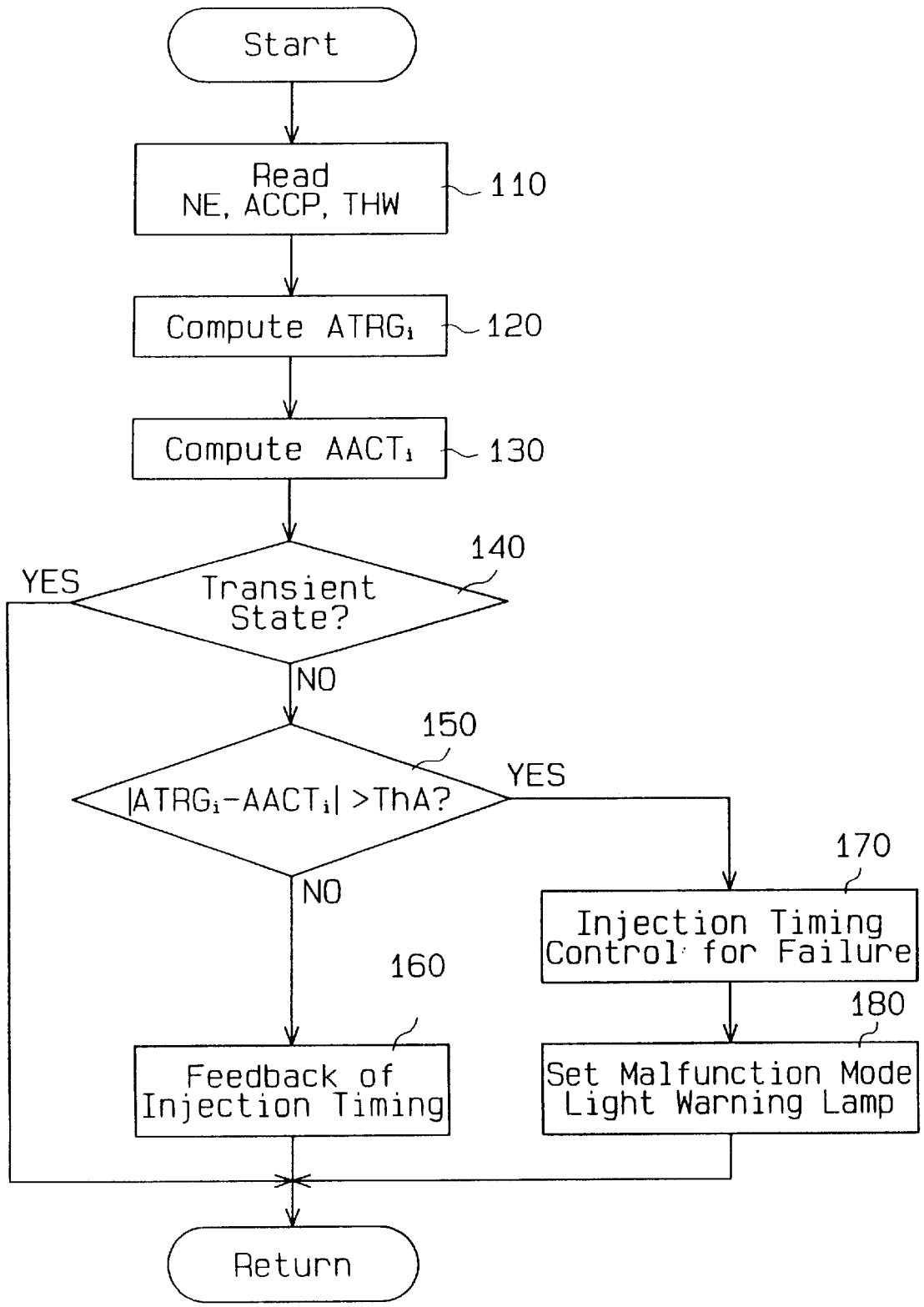
FIG. 3 is a flowchart illustrating a routine for controlling injection of fuel for the first embodiment.

Among the various routines carried out by the CPU 81, the flowchart of FIG. 3 illustrates a routine for controlling the fuel injection amount. The ECU 81 periodically executes the routine for every predetermined time period. Control programs related to various routines are prestored in the ROM 83 of the ECU 81.

In step 110, the ECU 81 detects the running condition of the engine 13. For instance, the ECU 81 acquires the engine speed NE, the acceleration pedal angle ACCP and the coolant temperature THW, which are respectively detected by the engine speed sensor 77, the acceleration pedal angle sensor 72 and the coolant temperature sensor 74.

In the subsequent step 120, the ECU 81 calculates the target injection timing ATRGi according to the running condition of the engine 13. Specifically, the ECU 81 acquires the basic injection timing according to the engine speed NE and the acceleration pedal angle ACCP (engine load) from function data or a predetermined equation. The value of this basic injection timing is compensated in accordance with the coolant temperature THW to be set as the target injection timing ATRGi. The delayed response of the timer 57 is not taken into account in computing the target injection timing ATRGi.

In step 130, the ECU 81 calculates the actual injection timing AACTi. Specifically, the ECU 81 acquires a crank angle pulse output from the crank angle sensor 75 and a pump angle pulse output from the engine speed sensor 77. The ECU 81 detects the phase of the timer 57 based on both pulses and computes the actual injection timing AACTi then.

In step 140, the ECU 81 determines if the engine is in a transient state. For example, the ECU 81 determines if the ratio of a change in the engine speed NE (the amount of a change per unit time) is equal to or greater than a predetermined value. When the change amount of the engine speed NE is equal to or greater than the predetermined value, the ECU 81 determines that the engine 13 is in a transient state. When the change amount of the engine speed NE is less than the predetermined value, the ECU 81 determines that the engine 13 is in normal state. With the engine 13 in the normal state, the response delay of the timer 57 is small. If the injection timing control apparatus is functioning properly, therefore, the actual injection timing AACTi comes closer to the target injection timing ATRGi. When the engine 13 is in a transient state, the timer 57 has a large response delay. Even if the injection timing control apparatus is functioning properly, therefore, there is a large difference between the actual injection timing AACTi and the target injection timing ATRGi until the actual injection timing AACTi converges to the target injection timing ATRGi.

If the condition in the step 140 is not met, i.e., if the engine 13 is in a normal state, the ECU 81 proceeds to step 150. In step 150, the ECU 81 acquires the difference between the target injection timing ATRGi and the actual injection timing AACTi and determines if the absolute value of this difference is greater than a predetermined abnormal reference value ThA. If this condition is not fulfilled (i.e., $|ATRGi-AACTi| \leq ThA$), the ECU 81 determines that the injection timing control apparatus is properly functioning in the normal state.

In step 160, the ECU 81 performs feedback control of the injection timing. This will be discussed more specifically. When the target injection timing ATRGi is greater than the actual injection timing AACTi, the ECU 81 changes the duty ratio for the TCV 65 so as to advance the actual injection timing. When the target injection timing ATRGi is smaller than the actual injection timing AACTi, the ECU 81 changes the duty ratio for the TCV 65 so as to delay the actual injection timing. When the target injection timing ATRGi is equal to the actual injection timing AACTi, the ECU 81 maintains the duty ratio. As apparent from the above, the ECU 81 monitors the operation of the timer 57 based on the pump angle pulse and crank angle pulse and executes the duty control on the TCV 65 so that the actual injection timing AACTi coincides with the target injection timing ATRGi.

If the condition in step 150 is satisfied (i.e., $|ATRGi-AACTi|>ThA$), the ECU 81 determines that the injection timing control apparatus is suffering some failure. Even if the TCV 65 is controlled in this case, it is difficult to set the actual injection timing AACTi equal to the target injection timing ATRGi. Therefore, the ECU 81 performs injection timing control for failure in step 170. During the injection timing control for failure, the ECU 81 stops the aforementioned feedback control of the injection timing in step 160 and holds the actual injection timing AACTi at a predetermined delayed value which will cause the engine 13 to function in an acceptable manner. Alternatively, the ECU 81 may keep the feedback control to restrict the value of the target injection timing ATRGi. In this case, the actual injection timing AACTi is prevented from becoming an extremely large or small value, which would cause the engine 13 to function improperly.

The causes for the actual injection timing AACTi not to converge to the target injection timing ATRGi in the normal state include a failure in the engine speed sensor 77 or the TCV 65 and clogging of the hydraulic circuit, for example.

In step 180, the ECU 81 sets the abnormal mode and turns on the warning lamp 67 before terminating this routine.

When the condition in step 140 is met or when the engine 13 is in a transient state, the ECU 81 terminates this routine. In other words, the ECU 81 inhibits the malfunction determination when the engine 13 is in a transient state. In a transient state, the difference between the target injection timing ATRGi and the actual injection timing AACTi may be greater than the reference value ThA in step 150 due to the delayed response of the timer 57. If the ECU 81 performs the malfunction determination using this reference value ThA, the ECU 81 may erroneously determine that the injection timing control apparatus is malfunctioning. The prohibition of the malfunction determination in a transient state prevents such an erroneous determination.

According to the first embodiment, as specifically described above, it is determined whether the malfunction determination should be executed in accordance with the running condition of the engine 13. The ordinary malfunction determination is executed in the normal state, while the malfunction determination is inhibited in the transient state in consideration of the delayed response of the timer 57. This system therefore can avoid erroneous determination in a transient state and improve the precision of the malfunction determination.

As this embodiment inhibits the malfunction determination in a transient state, it is unnecessary to set a different reference value ThA to be used for a transient states.

(Second Embodiment)

The second embodiment will now be described with reference to FIG. 4. This embodiment differs from the first embodiment in that the malfunction determination is executed even in a transient state, and the reference value ThA differs between the transient state and the normal state.

To avoid redundancy, like or same reference numerals are given to those components that are like or same as the corresponding components of the first embodiment.

Figure 4:
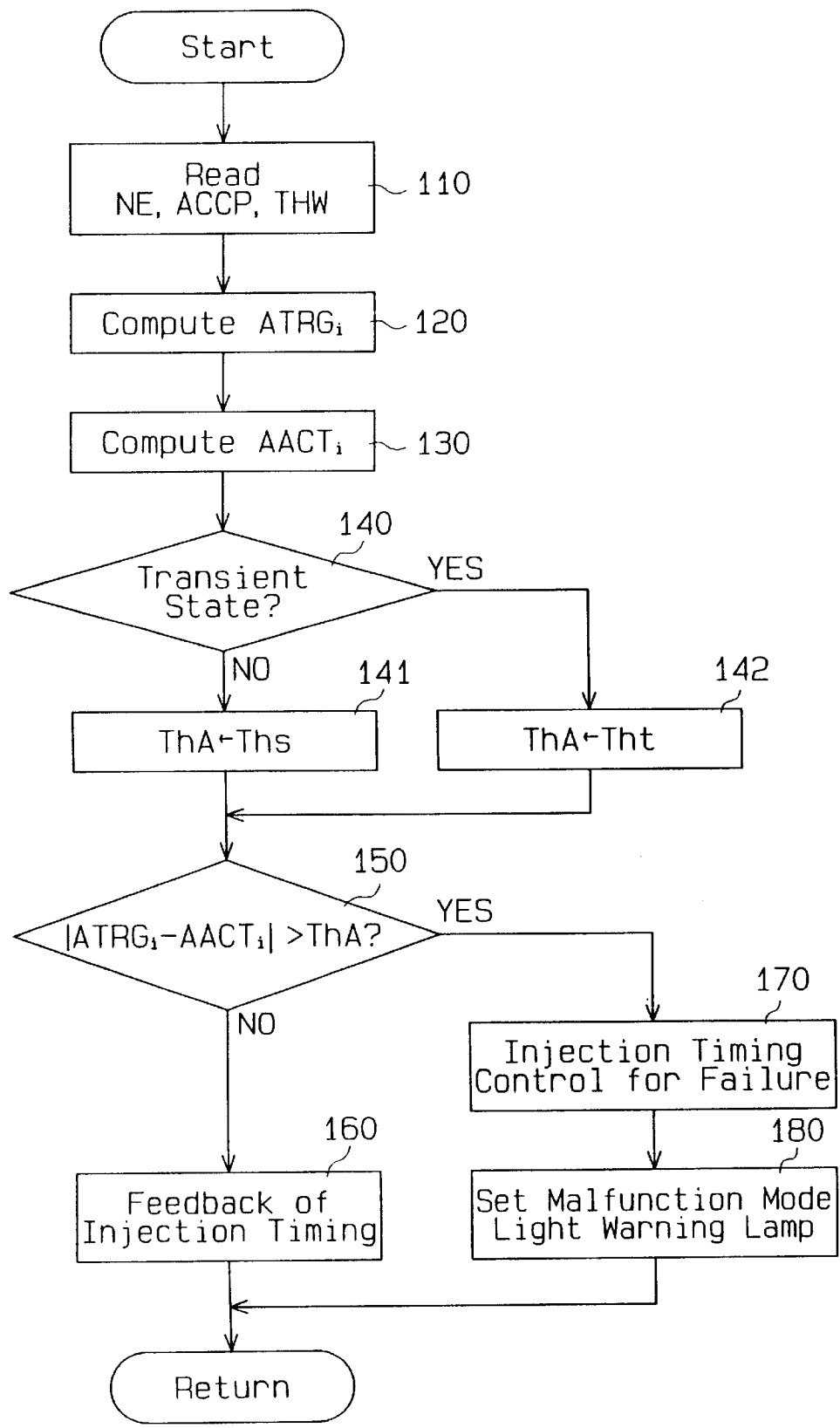
FIG. 4 is a flowchart for a second embodiment illustrating a routine for controlling injection of fuel.

As shown in FIG. 4, steps 110 to 140 are the same s step 110 to 140 of FIG. 3.

When the condition in step 140 is not fulfilled, i.e., when the engine 13 is running normally, the ECU 81 proceeds to step 141. In step 141, the ECU 81 sets a reference value Ths (>0) for the normal state as the reference value ThA. Even if the actual injection timing AACTi converges to the target injection timing ATRGi in the injection timing control, the actual injection timing AACTi varies within a certain range around the target injection timing ATRGi. To prevent this variation from being determined as a failure, the reference value Ths is set to a value greater than zero.

When the condition in step 140 is met, i.e., when the engine 13 is in a transient state, the ECU 81 proceeds to step 142. In step 142, the ECU 81 sets a reference value Tht (>Ths) for the transient state as the reference value ThA. This reference value Tht is set greater than the reference value Ths for the normal state in the light of the delayed response of the timer 57 in a transient state. Both reference values Ths and Tht have previously been stored in the ROM 83.

After setting the reference value ThA in step 141 or 142, the ECU 81 performs the same processing (steps 150–180) as done in the first embodiment and terminates this routine. In step 150, the ECU 81 compares the absolute value of the difference between the target injection timing ATRGi and the actual injection timing AACTi with the reference value ThA to determine if the injection timing control apparatus is malfunctioning. When the difference is equal to or smaller than the reference value ThA, the ECU 81 determines that the injection timing control apparatus is functioning properly. When the difference is greater than the reference value ThA, the ECU 81 determines that the injection timing control apparatus is malfunctioning.

In this embodiment, a reference value ThA suitable for the transient state or the normal state of the engine 13 is selected. Even if the response delay of the timer 57 becomes greater in a transient state, increasing the reference value ThA makes it harder to determine that the injection timing control apparatus is malfunctioning, thus improving the accuracy in the determination.

Prior Art apparatus, which use a single reference value regardless of the running condition of the engine, set the reference value to a relatively large value in order to avoid erroneous determination in the transient state of the engine. In this case, it becomes difficult to determine that the injection timing control apparatus is malfunctioning when the actual injection timing does not converge to the target injection timing in the normal state.

By contrast, this embodiment selectively uses two reference values Ths and Tht in accordance with the running condition of the engine 13. The malfunctioning of the injection timing control apparatus is therefore detected accurately irrespective of the running condition of the engine 13.

(Third Embodiment)

The third embodiment will now be described with reference to FIGS. 5 and 6. This embodiment differs from the second embodiment in that the reference value ThA is changed in accordance with the deviation of the target injection timing ATRGi for a predetermined time.

Figure 5:
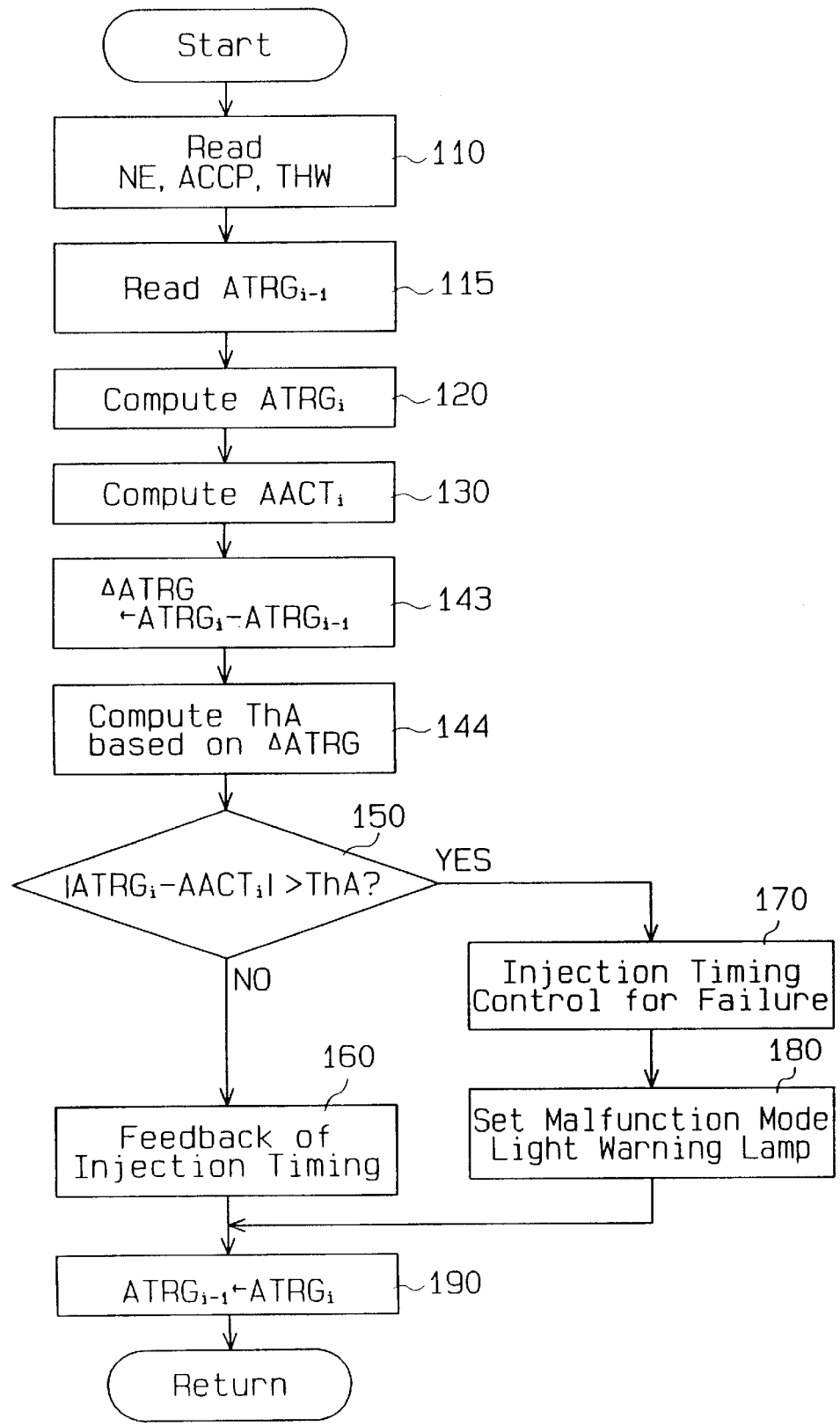
FIG. 5 is a flowchart for a third second embodiment illustrating a routine for controlling injection of fuel.

As shown in FIG. 5, the ECU 81 detects the running condition of the engine 13 in step 110 as done in the above-described embodiment. In step 115, the ECU 81 reads a target injection timing ATRGi−1, calculated in the previous routine, from the RAM 84. The ECU 81 calculates the current target injection timing ATRGi in step 120. The ECU 81 calculates the actual injection timing AACTi in step 130.

The ECU 81 computes the deviation of the target injection timing, $\Delta$ATRG, in step 143. This deviation $\Delta$ATRG is computed as the difference between the current target injection timing ATRGi and the previous target injection timing ATRGi−1.

Figure 6:
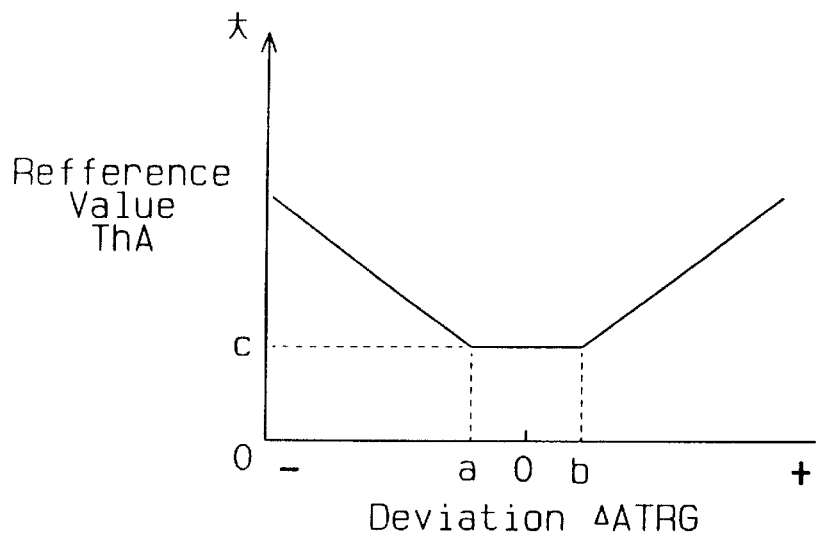
FIG. 6 is a graph showing the relationship between a deviation of the target injection timing and a reference value for the third embodiment.

In step 144, the ECU 81 calculates the reference value ThA referring to the graph given in FIG. 6. As shown in FIG. 6, the reference value ThA for the deviation $\Delta$ATRG is predefined on this graph. Between a predetermined value, a, where the deviation $\Delta$ATRG is slightly smaller than zero and a predetermined value b where the deviation $\Delta$ATRG is slightly greater than zero, i.e., when a$\leq\Delta$ATRG$\leq$b, the reference value ThA is set the minimum value c (>zero). When a>$\Delta$ATRG, as the deviation $\Delta$ATRG becomes smaller, the reference value ThA is increased. When $\Delta$ATRG>b, as the deviation $\Delta$ATRG becomes larger, the reference value ThA is increased. Referring to the graph, the reference value ThA is set to the minimum value (=zero) when the target injection timing ATRG does not change (the normal state), whereas the reference value ThA is set to a large value in view of the delayed response of the timer 57 when the target injection timing ATRG changes promptly (the transient state).

In steps 150 to 180, the ECU 81 performs the same processing as done in the first and second embodiments. Based on the difference between the target injection timing ATRGi and the actual injection timing AACTi, the ECU 81 determines if the injection timing control apparatus is functioning properly. At this time, the reference value ThA computed from the graph in FIG. 6 is used.

In step 190, the ECU 81 sets the current target injection timing ATRGi as the previous target injection timing ATRGi−1 for the next computation. The ECU 81 stores this value (ATRGi−1) in the RAM 84 and then terminates this routine.

According to this embodiment, as specifically discussed above, the reference value ThA is set to a value according to the deviation $\Delta$ATRG of the target injection timing ATRGi. When the deviation $\Delta$ATRG is small (a$\leq\Delta$ATRG$\leq$b), i.e., in the normal state, a small reference value ThA (c) is used as in the second embodiment. When the deviation $\Delta$ATRG is large, i.e., in the transient state, no single reference value ThA is used. The reference value ThA, which increases as the deviation $\Delta$ATRG increases or decreases, is used in the transient state. In other words, this embodiment uses the proper reference value ThA according to the ratio of a change in the target injection timing ATRGi (deviation $\Delta$ATRG) or the degree of the response delay of the timer 57. This improves the accuracy of the malfunction determination in the transient state.

(Fourth Embodiment)

Figure 7:
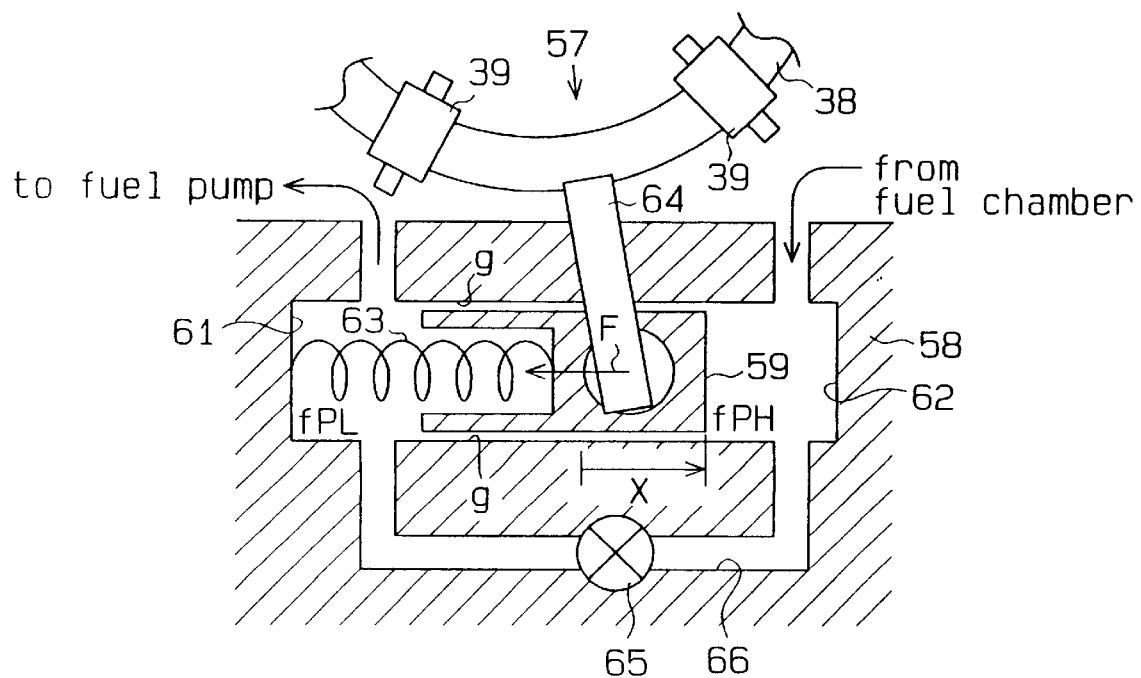
FIG. 7 is a diagrammatic drawing showing the structure of a timer of a fourth embodiment.

The fourth embodiment will now be discussed with reference to FIGS. 7 and 8. In this embodiment, the delayed response of the timer 57 in the normal operation is considered in the malfunction determination.

To begin with, a predicted actual injection timing ATRGSMi will be discussed. The delayed response of the timer 57 in the normal operation is taken into account in this predicted actual injection timing ATRGSMi. In FIG. 7 showing the timer 57, "fPL" is the force acting on the piston 59 from the low pressure chamber 61, and "fPH" is the force acting on the piston 59 from the high pressure chamber 62. The force fPL is given by the product of the fuel pressure in the low pressure chamber 61 and the pressure-receiving area of the piston 59 on the low pressure chamber (61) side. Likewise, the force fPH is given by the product of the fuel pressure in the high pressure chamber 62 and the pressure-receiving area of the piston 59 on the high pressure chamber (62) side. The mass and the amount of displacement of the piston 59 are denoted as "m" and "x", respectively, the viscosity coefficient of the fuel as "c" and the spring constant of the timer spring 63 as "k". The viscosity coefficient c is what is acquired when the fuel temperature THF is constant, the amount of fuel which leaks to the low pressure chamber 61 from the high pressure chamber 62 through the clearance g between the piston 59 and the timer housing 58 is constant, and the amount of fuel which flows into the low pressure chamber 61 from the high pressure chamber 62 through a communication passage 66 and the TCV 65 is constant. The force fPH does not include force F, which acts on the piston 59 via the roller ring 39 and the slide pin 64 when the face cams 37a of the cam plate 37 come over the cam roller 39. Using those variables, the equation of motion for the piston 59 is given as follows.

$$m \cdot d^2x/dt^2 + c \cdot dx/dt + kx = fPH(t) - fPL \quad (1)$$

The difference between fPH(t) and fPL in the equation (1) is defined as $\Delta fp(t)$. The mass m is small enough to be negligible as compared with the viscosity coefficient c and the spring constant k. Thus, the equation (1) can be rewritten as:

$$c \cdot dx/dt + kx \approx \Delta fp(t) \quad (2)$$

Generally, an equation (3) is satisfied.

$$dx/dt \approx (xi - xi - 1)/\Delta t \quad (3)$$

where $\Delta t$ is the time needed for the amount of displacement x to be changed to xi from xi-1.

The equation of motion (2) is expressed as follows, discretely with respect to $\Delta t$ using the equation (3).

$$c \cdot \{(xi - xi - 1)\Delta t\} + kxi = \Delta fpi \quad (4)$$

Executing Laplace transform of the equation (4) yields an equation (5). In the equation (5), a Laplace operator is denoted as "s".

$$x/\Delta Fp = 1/(c \cdot s + k) \quad (5)$$

If the difference $\Delta fp(t)$ between the force acting on the piston 59 from the low pressure chamber 61 and the force acting on the piston 59 from the high pressure chamber 62 is adjusted under the duty control of the TCV 65, the actual injection timing can converge to the target injection timing ATRG(t). Thus, the relationship between the difference $\Delta fp(t)$ and the target injection timing ATRG(t) is given by the following equation (6).

$$\Delta fp(t) = \alpha \cdot ATRG(t) \quad (6)$$

where $\alpha$ is a coefficient for converting the target injection timing ATRG(t) to the difference $\Delta fp(t)$.

When the position of the piston 59 changes, the position of the roller ring 38 changes too. This changes the actual injection timing as well as the reciprocation timing for the plunger 42. Thus, the relationship between the amount of displacement x and the predicted actual injection timing ATRGSM(t) is given by the following equation (7).

$$x = \beta \cdot ATRGSM(t) \quad (7)$$

where $\beta$ is a coefficient for converting the predicted actual injection timing ATRGSM(t) to the amount of displacement x.

Equations (8) and (9) below are derived by substituting the equations (6) and (7) into the equation (4).

$$(ATRGSMi - ATRGSMi - 1)/\Delta t + k \cdot ATRGSMi = \alpha \cdot ATRGi \quad (8)$$

$$ATRGSMi = (\alpha \cdot \Delta t \cdot ATRGi + c \cdot ATRGSMi - 1)/(c + k \cdot \Delta t) \quad (9)$$

ATRGSMi in the equation (9) is the predicted injection timing when the timer 57 is functioning properly.

The fuel injection timing control routine illustrated in FIG. 8 will now be described. The ECU 81 performs the same processes in steps 110, 120, 130, 140–142 and 160–180 as are performed in the second embodiment, and their description will not be repeated.

In step 115, the ECU 81 reads the predicted actual injection timing ATRGSMi-1 which was calculated in the previous routine.

In the next step 135, the ECU 81 computes the current predicted actual injection timing ATRGSMi-1 from the equation (9) using the target injection timing ATRGi and the previous predicted actual injection timing ATRGSMi-1.

In step 155, the ECU 81 determines if the absolute value of the difference between the actual injection timing AACTi and the predicted actual injection timing ATRGSMi is greater than the reference value ThA. If this condition is not fulfilled (i.e., |AACTi-ATRGSMi|≦ThA), the ECU 81 determines that the injection timing control apparatus is properly functioning. If the condition in step 155 is satisfied (i.e., |AACTi-ATRGSMi|>ThA), on the other hand, the ECU 81 determines that the injection timing control apparatus is malfunctioning.

In step 190, the ECU 81 sets the current predicted actual injection timing ATRGSMi as the previous predicted actual injection timing ATRGSMi-1 for the next computation. The ECU 81 stores this value (ATRGSMi-1) in the RAM 84 and then terminates this routine.

According to this embodiment, as specifically discussed above, the malfunctioning of the injection timing control apparatus in a transient state is determined based on the difference between the predicted actual injection timing ATRGSMi, acquired in view of the response delay of the timer 57 in normal operation and the actual injection timing AACTi. Therefore, the precision in the malfunction determination is higher than that where the one in the case the malfunction determination is executed merely using the difference between the target injection timing ATRGi and the actual injection timing AACTi.

(Fifth Embodiment)

The fifth embodiment will now be discussed with reference to FIGS. 9 and 10. This embodiment differs from the fourth embodiment in that the influence of the fuel temperature THF on the response delay of the timer 57 is taken into account in calculating the predicted actual injection timing ATRGSMi. That is, the predicted actual injection timing ATRGSMi is compensated based on the fuel temperature THF. Since the processes from step 140 to the end of the routine in this embodiment are the same as those shown in FIG. 8, they will be neither illustrated nor described. As the processes in steps 115, 120, 130 and 135 are the same as those in the corresponding steps in the fourth embodiment, their description will not be repeated.

The reason for the reflection of the fuel temperature THF on the response delay of the timer 57 is as follows. If the fuel temperature THF is constant, the amount of fuel leak in the clearance g between the piston 59 and the timer housing 58 is constant and the amount of fuel flowing through the communication passage 66 and the TCV 65 is constant, and the predicted actual injection timing ATRGSMi coincides with the actual injection timing AACTi. The fuel temperature THF however actually varies in accordance with the operation of the injection pump 32. For instance, the fuel temperature THF is low when the pump 32 is activated, and rises thereafter as time goes. The increase in the fuel temperature THF decreases the viscosity of fuel, increasing the amount of fuel leak in the clearance g between the piston 59 and the timer housing 58 and the amount of fuel flowing through the communication passage 66 and the TCV 65. As the fuel pressures in the low pressure chamber 61 and the high pressure chamber 62 vary, the forces fPL and fPH which act on the piston 59 change. Therefore, the fuel temperature THF is associated with the equation (9) to compute the predicted actual injection timing ATRGSMi in light of the fuel temperature THF.

This will be discussed more specifically. Assuming that the target injection timing ATRGi does not change, the predicted actual injection timing ATRGSMi finally becomes the target injection timing ATRGi. With α=k, therefore, the equation (9) is rewritten as $$ATRGSM = \{ATRGi + (c/k\Delta t) \cdot ATRGSMi - 1\}/(1 + c/k\Delta t) \quad (10)$$

The injection timing control routine illustrated in FIG. 9 will now be described. In step 111, the ECU 81 acquires the engine speed NE, the acceleration pedal angle ACCP, the coolant temperature THW and the fuel temperature THF.

Figure 10:
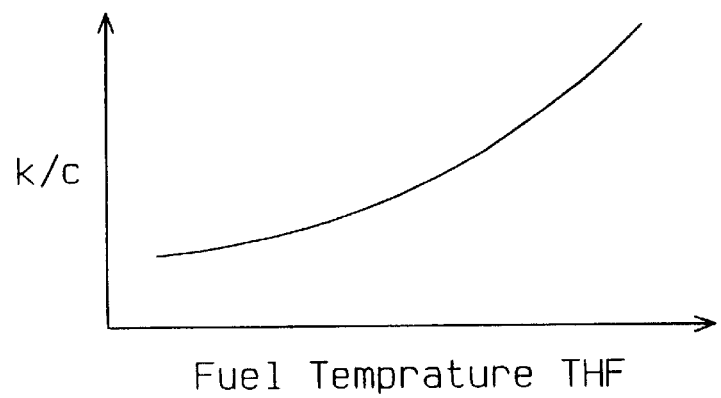
FIG. 10 is a graph showing the relationship between the fuel temperature and the reciprocal of a time constant for the fifth embodiment.

In step 131, the ECU 81 computes the reciprocal k/c of the time constant according to the fuel temperature THF based on the graph in FIG. 10. This graph is obtained by plotting the reciprocal k/c of the time constant obtained as the fuel temperature THF is changed. The graph shows an increase in the reciprocal k/c as the fuel temperature THF rises.

As mentioned above, a change in the viscosity of the fuel according to the fuel temperature THF varies the amount of fuel leakage in the clearance g. This changes the fuel pressure on the piston 59, thus affecting the response delay of the timer 57. However, the influence of the fuel temperature THF is considered in calculating the predicted actual injection timing ATRGSMi. That is, the predicted actual injection timing ATRGSMi is compensated based on the fuel temperature THF to be more accurate. The acquired predicted actual injection timing ATRGSMi therefore comes closer to the actual injection timing AACTi when the timer 57 operates properly. The precision of the malfunction determination is further improved by using this predicted actual injection timing ATRGSMi in this determination.

(Sixth Embodiment)

Figure 11:
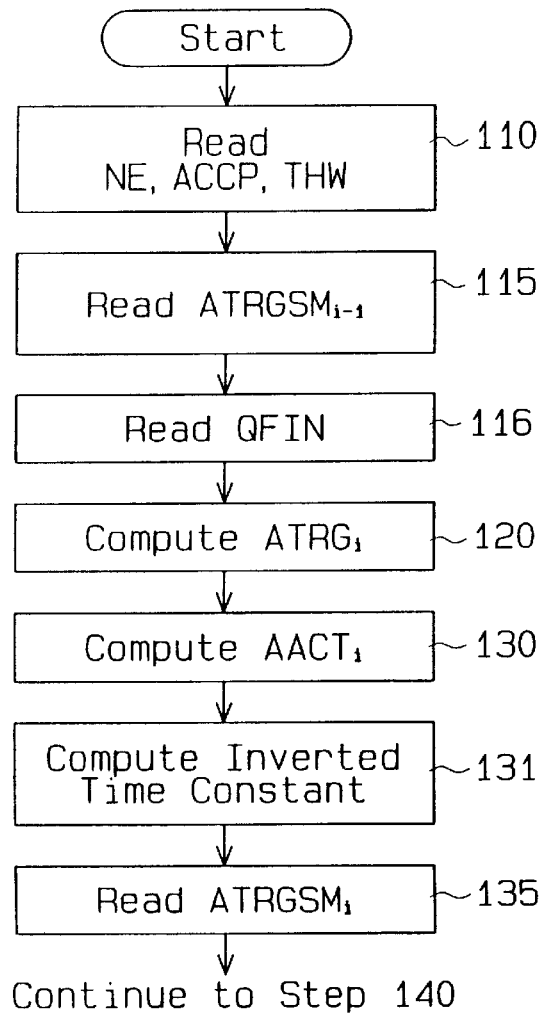
FIG. 11 is a part of flowchart of sixth embodiment illustrating a routine for controlling injection of fuel.

The sixth embodiment will now be discussed with reference to FIGS. 11 and 12. This embodiment differs from the fourth embodiment in that the influence of the amount of fuel injection on the response delay of the timer 57 is taken into account in calculating the predicted actual injection timing ATRGSMi. In other words, the predicted actual injection timing ATRGSMi is compensated based on the fuel injection amount. Since the subsequent processes from step 140 in this embodiment are the same as those shown in FIG. 8, they will be neither illustrated nor described. Since the other processes except for steps 110, 116 and 131 are the same as those in the corresponding steps of the fifth embodiment, their description will be omitted.

The reason for the reflection of the fuel injection amount on the response delay of the timer 57 is as follows. If the position of the piston 59, which determines the injection timing, is not affected by the rotation of the cam plate 37 at all in the fourth embodiment, the predicted actual injection timing ATRGSMi coincides with the actual injection timing AACTi. However, the position of the piston 59 is actually affected slightly by the rotation of the cam plate 37. More specifically, the clockwise force F in FIG. 7 from the cam plate 37 acts on the roller ring 38 in the period from the point when the engagement of each face cam 37a with the cam roller 39 starts (the beginning of the lifting of the plunger 42) to the point when the top of the face cam 37a contacts the cam roller 39, i.e., the period during which the face cam 37a rides over the cam roller 39. This force F is transmitted via the slide pin 64 to the piston 59 to move the piston 59 leftward in FIG. 2 (in the direction to delay the injection timing). The force F therefore slows the response at the time of advancing the injection timing.

The force F tends to increase as the engine speed NE becomes and when the fuel injection amount is large. In this respect, the predicted actual injection timing ATRGSMi is computed from the equation (10) in consideration of the influences of the engine speed NE and an injection instruction value QFIN on the response delay of the timer 57.

The injection timing control routine illustrated in FIG. 11 will now be described. In step 110, the ECU 81 acquires the engine speed NE, the acceleration pedal angle ACCP and the coolant temperature THW.

In step 116, the ECU 81 reads the injection instruction value QFIN, which has been computed in a separate routine. Specifically, the basic fuel injection amount is calculated from the engine speed NE and the acceleration pedal angle ACCP, and the injection instruction value QFIN is acquired by compensating this basic fuel injection amount based on the coolant temperature THW, the intake air temperature THA and the intake pressure VPIM.

Figure 12:
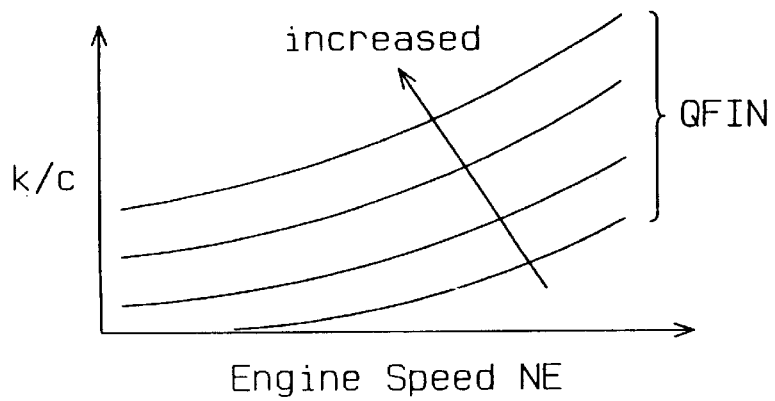
FIG. 12 is a graph showing the relationship among the engine speed, injection instruction value and the reciprocal of the time constant for the sixth embodiment.

Next, in step 131, the ECU 81 computes the reciprocal k/c of the time constant according to the engine speed NE and the injection instruction value QFIN referring to the graph in FIG. 12. This graph is obtained by plotting the reciprocals k/c of the time constant obtained while changing the engine speed NE and the injection instruction value QFIN in the timer 57. The graph shows the reciprocal k/c increasing as the engine speed NE becomes greater and as the injection instruction value QFIN becomes larger.

According to this embodiment, at the time the cam plate 37 rides over the cam roller 39, the force F from the cam plate 37 acts on the cam roller 39. This force F acts on the piston 59 via the roller ring 38, the slide pin 64, etc., thus affecting the response delay of the timer 57. The force F to be applied to the piston 59 from the cam plate 37 is however taken into account in the computation of the predicted actual injection timing ATRGSMi. That is, the predicted actual injection timing ATRGSMi is compensated based on the engine speed NE and the injection instruction value QFIN. The acquired predicted actual injection timing ATRGSMi therefore comes closer to the actual injection timing AACTi when the timer 57 operates properly. The precision of the malfunction determination, particularly, the precision in the determination at the time of quickening the injection timing (advancing the valve angle), is improved by using this predicted actual injection timing ATRGSMi in this determination.

Although only several embodiments of the present invention have been described herein, it should be apparent to those skilled in the art that the present invention may be embodied in many other specific forms without departing from the spirit or scope of the invention. Particularly, it should be understood that the invention may be embodied in the following forms.

(1) The actual injection timing AACTi may be detected directly by a sensor. This sensor may be a sensor (nozzle lift sensor) that detects the lifting of the nozzle needle of the injection nozzle 21, or may be a sensor (pressure sensor) that detects the pressure of fuel to be supplied under pressure to the injection nozzle 21 from the injection pump 32. In the latter case, the pressure sensor may be arranged above the injection nozzle 21 or may be disposed midway in the pipe that connects the injection pump 32 to the injection nozzle 21.

(2) The ratio of a change in the load (acceleration pedal angle ACCP) may be used instead of the ratio of a change in the engine speed NE as the condition for determining the transient state of the engine 13. When the amount of a change in the load per unit time is greater than a predetermined value in this case, it is determined that the engine 13 is in a transient state.

Figure 8:
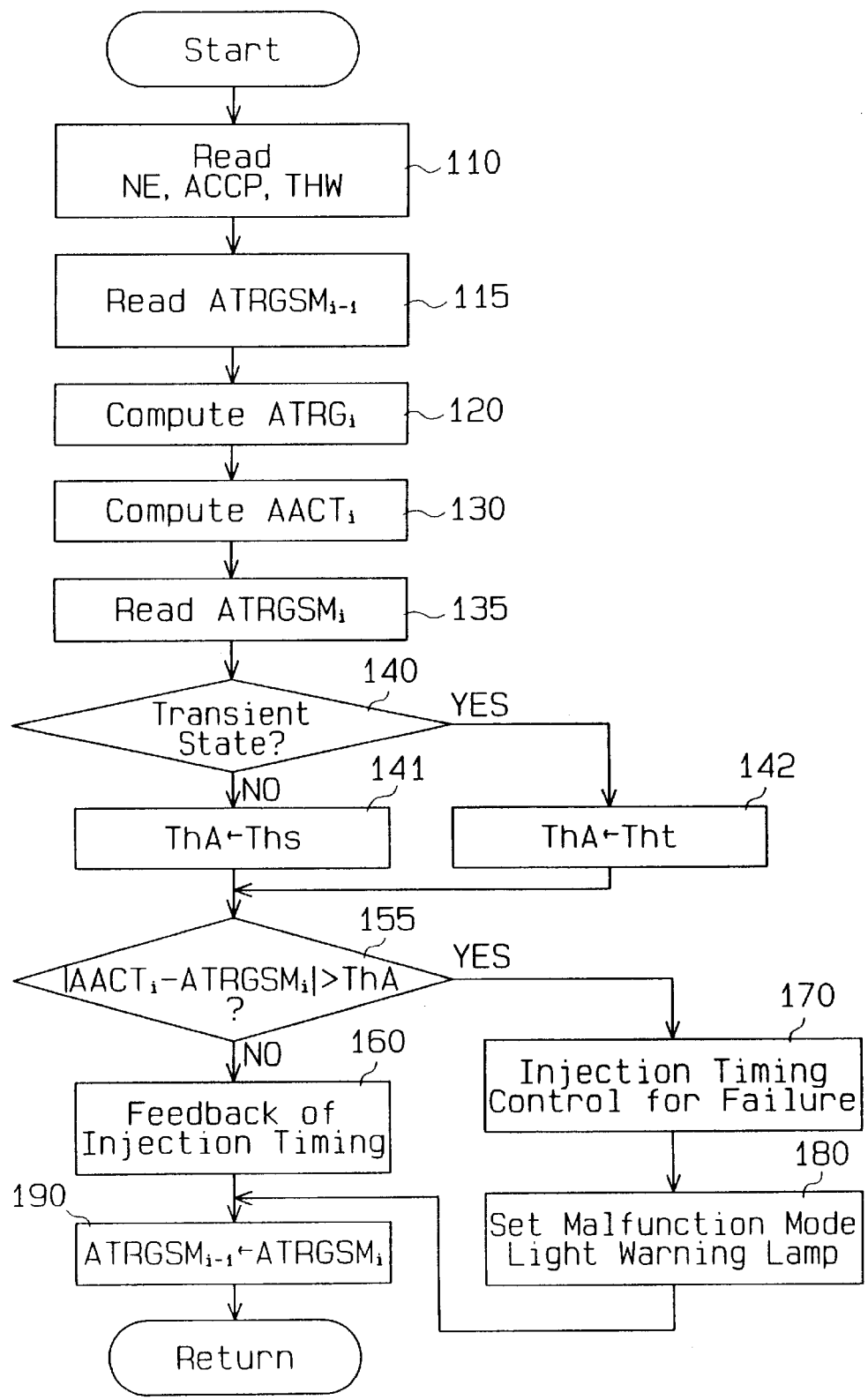
FIG. 8 is a flowchart for the fourth embodiment illustrating a routine for controlling injection of fuel.
Figure 9:
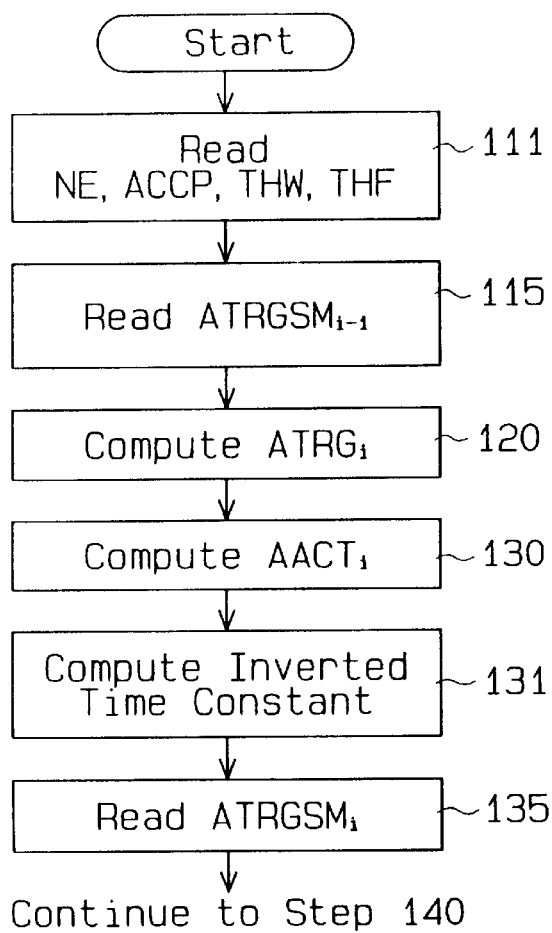
FIG. 9 is a part of flowchart of a fifth embodiment illustrating a routine for controlling injection of fuel.

(3) The processes in steps 140, 141 and 142 in the injection timing control routine in FIG. 8 may be omitted.

(4) The fifth embodiment may be combined with the sixth embodiment. In other words, the influences of both the fuel temperature THF and the force F at the time the face cam 37a rides over the cam roller 39 on the response delay of the timer 57 are considered in the computation of the predicted actual injection timing ATRGSMi. This modification further improves the precision of the predicted actual injection timing ATRGSMi.

(5) In the above embodiments, the warning lamp 67 is lit when it is determined that there is a malfunction in the fuel injection system. However, the warning lamp 67 may be eliminated. In this case, the detection of the malfunctioning is stored in the backup RAM 85 as diagnosis data and read out during maintenance of the vehicle.

Therefore, the present examples and embodiments are to be considered as illustrative and not restrictive and the invention is not to be limited to the details given herein, but may be modified within the scope and equivalence of the appended claims.

What is claimed:

1. A system for a diesel engine for detecting malfunctioning of an injection timing control apparatus for controlling an injection timing of fuel, pressurized by a pump, to be injected from injection nozzles, the system comprising:

a first detecting means for detecting a running condition of said engine as a detected value;

a first computing means for computing a target injection timing based on said running condition detected by said first detecting means;

a second detecting means for detecting an actual injection timing;

a control means for controlling the injection timing to set said actual injection timing to said target injection timing;

a second computing means for computing a difference between said actual injection timing and said target injection timing; and a first determining means for determining whether said injection timing control apparatus is malfunctioning, wherein said first determining means determines that said injection timing control apparatus is malfunctioning when said difference computed by said second computing means is greater than a predetermined value, and wherein the determination by said first determining means is altered in accordance with said running condition of said engine.

2. The system according to claim 1, further comprising:

a second determining means for determining whether said detected value of said first detecting means is changing rapidly; and inhibition means for inhibiting determination by said first determining means when a rapid change in said detecting value is determined by said second determining means.

3. The system according to claim 1, further comprising:

a second determining means for determining whether said detecting value of said first detecting means is changing rapidly and wherein said predetermined value is increased when a rapid change in said detecting value is determined by said second determining means.

4. The system according to claim 3, wherein a first value is used as said predetermined value when a rapid change in said detecting value is determined, and a second value is used as said predetermined value when a rapid change in said detecting value is not determined, said first value being greater than said second value.

5. The system according to claim 3, wherein said predetermined value is changed in accordance with a deviation of said target injection timing during a predetermined period.

6. The system according to claim 5, wherein said predetermined value is increased in proportion to said deviation.

7. The system according to claim 1, further comprising:

a third computing means for computing a predicted actual injection timing reflecting a response delay of said injection timing control apparatus; and a fourth computing means for computing a difference between said actual injection timing and said predicted actual injection timing, and wherein said first determining means determines that said injection timing control apparatus is malfunctioning when said difference computed by said fourth computing means is greater than a predetermined value.

8. The system according to claim 7, wherein said injection timing control apparatus is provided in said pump and the apparatus comprises:

a housing;

a piston accommodated in said housing in a reciprocative manner; and a first and second pressure chambers respectively provided at opposite ends of said piston in said housing, fluid pressure for moving said piston being supplied to said first and second pressure chambers, wherein the fuel injection timing is changed in accordance with an amount of movement of said piston.

9. The system according to claim 8, wherein said first detecting means includes a temperature sensor for detecting a temperature of a fluid to be supplied to said first and second pressure chambers, wherein said system further comprises a compensating means for compensating said predicted actual injection timing based on said detected temperature, and wherein said first determining means determines that said injection timing control apparatus is malfunctioning when a difference between said actual injection timing and said compensated predicted actual injection timing is greater than a predetermined value.

10. The system according to claim 7, further comprising:
   a fifth computing means for computing an amount of fuel to be injected from said injection nozzles; and
   a compensating means for compensating said predicted actual injection timing based on said computed amount of fuel; and
   wherein said first determining means determines that said injection timing control apparatus is malfunctioning when a difference between said actual injection timing and said compensated predicted actual injection timing is greater than a predetermined value.

11. The system according to claim 7, wherein said first detecting means includes an engine speed sensor for detecting the rotational speed of said engine, wherein said system further comprises compensating means for compensating said predicted actual injection timing based on said detected rotational speed, and wherein said first determining means determines that said injection timing control apparatus is malfunctioning when a difference between said actual injection timing and said compensated predicted actual injection timing is greater than a predetermined value.

12. The system according to claim 7, wherein said pump comprises:
   a shaft driven by said engine;
   a drive member provided rotatable with respect to said shaft;
   a driven member rotatable while in contact with said drive member; and
   a plunger rotatable together with said driven member to be reciprocatable, said plunger being rotated and reciprocated in accordance with movement of said driven member, the reciprocation of said plunger causing fuel to be drawn and compressed, said compressed fuel being supplied to said injection nozzles, and
   wherein said injection timing control apparatus further has a rod for connecting said piston to said drive member; and
   a timing for reciprocation of said plunger being changed by rotating said drive member by moving said piston;
   wherein said system further comprises a compensating means for compensating said predicted actual injection timing in accordance with a force from said drive member that acts on said driven member and is transmitted to said piston via said rod; and
   wherein said first determining means determines that said injection timing control apparatus is malfunctioning when a difference between said actual injection timing and said compensated predicted actual injection timing is greater than a predetermined value.

13. The system according to claim 7, wherein said system further comprises compensating means for compensating said predicted actual injection timing in accordance with a force to be applied to said injection timing control apparatus when said injection timing control apparatus operates; and
   wherein said first determining means determines that said injection timing control apparatus is malfunctioning when a difference between said actual injection timing and said compensated predicted actual injection timing is greater than a predetermined value.

14. A system for a diesel engine for detecting malfunctioning of an injection timing control apparatus for controlling an injection timing of fuel, pressurized by a pump, to be injected from injection nozzles, comprising:
   a first detecting means for detecting a running condition of said engine as a detected value;
   a first computing means for computing a target injection timing based on said running condition detected by said first detecting means;
   a second detecting means for detecting an actual injection timing;
   a control means for controlling the injection timing to set said actual injection timing to said target injection timing;
   a second computing means for computing a difference between said actual injection timing and said target injection timing;
   a third computing means for computing a predicted actual injection timing reflecting a response delay of said injection timing control apparatus; and
   a fourth computing means for computing a difference between said actual injection timing and said predicted actual injection timing; and
   a first determining means for determining whether said injection timing control apparatus is malfunctioning,
   wherein said first determining means determines that said injection timing control apparatus is malfunctioning when said difference computed by said fourth computing means is greater than a predetermined value.

15. The system according to claim 14, further comprising a compensating means for compensating said predicted actual injection timing based on said running condition detected by said first detecting means: and
   wherein said first determining means determines that said injection timing control apparatus is malfunctioning when a difference between said actual injection timing and said compensated predicted actual injection timing is greater than a predetermined value.

* * * * *

UNITED STATES PATENT AND TRADEMARK OFFICE
CERTIFICATE OF CORRECTION

PATENT NO. : 5,806,498
DATED : September 15, 1998
INVENTOR(S) : Akira Iwai, et al.

It is certified that error appears in the above-identified patent and that said Letters Patent is hereby corrected as shown below:

| Column | Line | |
|--------|------|---|
| 1 | 11 | After "whether" delete "of". |
| 1 | 57 | Change "takes place" to --take place--. |
| 2 | 4 | Change "affective" to --effective--. |
| 2 | 40 | After "together" insert --with--. |
| 2 | 54 | After "third" delete "second". |
| 2 | 63 | Before "flowchart" insert --a--. |
| 3 | 1 | Before "flowchart" insert --a--; before "sixth" insert --the--. |
| 3 | 29 | Change "A intake" to --An intake--. |
| 4 | 21 | After "teeth" insert --are--. |
| 5 | 8 | Change "S6" to --56--. |

UNITED STATES PATENT AND TRADEMARK OFFICE
CERTIFICATE OF CORRECTION

PATENT NO. : 5,806,498
DATED : September 15, 1998
INVENTOR(S) : Akira Iwai, et al.

It is certified that error appears in the above-identified patent and that said Letters Patent is hereby corrected as shown below:

| Column | Line | |
|--------|------|---|
| 5 | 45 | Change "This effects" to --This affects--. |
| 7 | 60 | Change "step 15O" to --step 150--. |
| 8 | 63 | Change "states" to --state--. |
| 9 | 7 | Change "same s step" to --same as step--. |
| 10 | 22 | After "is set" insert --to--. |
| 11 | 24 | Change "roller ring 39" to --roller ring 38--. |
| 12 | 53 | Delete "one in the case the". |
| 13 | 16 | Change "as time goes" to --as time passes--. |
| 16 | 54 | Change "chambers" to --chamber--. |

Signed and Sealed this

Twenty-fifth Day of January, 2000

Attest:

Attesting Officer

Acting Commissioner of Patents and Trademarks